United States Patent
Książek

(10) Patent No.: US 12,509,093 B2
(45) Date of Patent: Dec. 30, 2025

(54) EYE TRACKING FOR DETECTION OF DIMINISHED DRIVER CONTROL

(71) Applicant: Aptiv Technologies (2) S.à r.l., Luxembourg (LU)

(72) Inventor: Maciej Piotr Książek, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/474,827

(22) Filed: Sep. 26, 2023

(65) Prior Publication Data

US 2024/0101123 A1     Mar. 28, 2024

(30) Foreign Application Priority Data

Sep. 27, 2022   (EP) .................................. 22197925

(51) Int. Cl.
| | |
|---|---|
| *B60W 40/08* | (2012.01) |
| *B60W 50/00* | (2006.01) |
| *G06V 10/82* | (2022.01) |
| *G06V 20/59* | (2022.01) |
| *G06V 40/18* | (2022.01) |

(52) U.S. Cl.
CPC ........ *B60W 40/08* (2013.01); *B60W 50/0098* (2013.01); *G06V 10/82* (2022.01); *G06V 20/597* (2022.01); *G06V 40/18* (2022.01); *B60W 2040/0836* (2013.01); *B60W 2420/403* (2013.01); *B60W 2540/22* (2013.01); *B60W 2540/223* (2020.02); *B60W 2540/225* (2020.02); *B60W 2540/229* (2020.02)

(58) Field of Classification Search
CPC ............. B60W 40/08; B60W 50/0098; B60W 2040/0836; B60W 2420/403; B60W 2540/22; B60W 2540/223; B60W 2540/225; B60W 2540/229; G06V 10/82; G06V 20/597; G06V 40/18

See application file for complete search history.

(56) References Cited

U.S. PATENT DOCUMENTS

| | | | |
|---|---|---|---|
| 11,657,263 B2 * | 5/2023 | Arar ..................... | G06V 40/171 382/103 |
| 11,807,090 B2 * | 11/2023 | Minjeur .................. | A61B 5/18 |

(Continued)

OTHER PUBLICATIONS

Extended European Search Report for EP22197925.5, 9 pages Jan. 30, 2023.

(Continued)

*Primary Examiner* — Mohamed Barakat
(74) *Attorney, Agent, or Firm* — Miller Johnson

(57) ABSTRACT

A system for monitoring a driver operating a vehicle includes an input configured to receive eye tracking data for the driver. The system includes a processing block configured to determine gaze movement characteristics for the driver from the eye tracking data. The system includes a determination block configured to determine characteristics indicative of diminished driver control from the determined gaze movement characteristics. The determination block determines diminished driver control from the determined gaze movement characteristics being outside predetermined baseline gaze movement characteristic ranges derived from prerecorded gaze movement characteristic data for the driver.

10 Claims, 1 Drawing Sheet

(56) References Cited

U.S. PATENT DOCUMENTS

| | | | | |
|---|---|---|---|---|
| 2004/0233061 | A1* | 11/2004 | Johns | G06V 40/19 |
| | | | | 340/575 |
| 2006/0203197 | A1* | 9/2006 | Marshall | A61B 5/163 |
| | | | | 351/246 |
| 2010/0033333 | A1* | 2/2010 | Victor | A61B 5/7264 |
| | | | | 340/576 |
| 2018/0126901 | A1* | 5/2018 | Levkova | B60W 40/09 |
| 2021/0181837 | A1* | 6/2021 | Jiang | G06F 3/011 |
| 2021/0347364 | A1* | 11/2021 | Ratcliff | B60W 50/16 |
| 2022/0073079 | A1 | 3/2022 | Nilsson | |
| 2022/0203996 | A1* | 6/2022 | Katz | B60W 50/14 |

OTHER PUBLICATIONS

Ji et al., "Real-Time Eye, Gaze, and Face Pose Tracking for Monitoring Driver Vigilance," Real-Time Imaging, 8, pp. 357-377 (2002).

J.L. Booker, "End-position nystagmus as an indicator of ethanol intoxication" Science & Justice, vol. 41, Issue 2, Apr. 2001, pp. 113-116.

Ikuyo Akiyama, "The effect of alcohol on the control of the vestibulo-ocular reflex and gaze" 1989, vol. 92, Issue 2, pp. 239-245.

Masayo Takahaski, "The effect of alcohol on the vestibulo-ocular reflex and gaze regulation" Arch Otorhinolaryngol vol. 246, pp. 195-199 (1989).

Shiferaw et al., "Gaze Entropy Measures Reveal Alcohol-Induced Visual Scanning Impairment During Ascending and Descending Phases of Intoxication," Journal of Studies on Alcohol and Drugs, 80(2), 236-244 (2019).

Shiferaw et al., "Gaze entropy measures detect alcohol-induced driver impairment" Drug and Alcohol Dependence vol. 204, Nov. 1, 2019, 107519, 6 pages.

J. Esser, "Pharmacologically-caused eye movement disorders—differential diagnosis and mechanisms of action" Fortschr Neurol Psychiatr 1983; 51(2): 41-56 (Abstract).

Hayley et al., "Amphetamine-induced alteration to gaze parameters: A novel conceptual pathway and implications for naturalistic behavior" Progress in Neurobiology, vol. 199, Apr. 2021, 101929.

We Collins, "Effects of D-amphetamine and of secobarbital on optokinetic and rotation-induced nystagmus" Aviation, Space, and Environmental Medicine, Apr. 1, 1975, 46(4 Sec 1):357-364 (Abstract).

Slattery et al., "Common ocular effects reported to a poison control center after systemic absorption of drugs in therapeutic and toxic doses," Current Opinion in Ophthalmology 25(6): p. 519-523, Nov. 2014.

Romano et al., "Gaze-evoked nystagmus induced by alcohol intoxication" J Physiol 595.6 (2017) pp. 2161-2173.

Jessica Bruna Santana Silva, "Effects of acute alcohol ingestion on eye movements and cognition: A double-blind, placebo-controlled study" PLoS One, vol. 12, Oct. 12, 2017, pp. 1-16.

Maple-Horvat et al., "Alcohol Badly Affects Eye Movements Linked to Steering, Providing for Automatic in-Car Detection of Drink Driving" Neuropsychopharmacology, vol. 33, pp. 849-858, May 2007.

1999 Traffic Techs, "Standardized Field Sobriety Test (SFST) Validated at BACS Below 1.10 Percent," 7 pages.

* cited by examiner

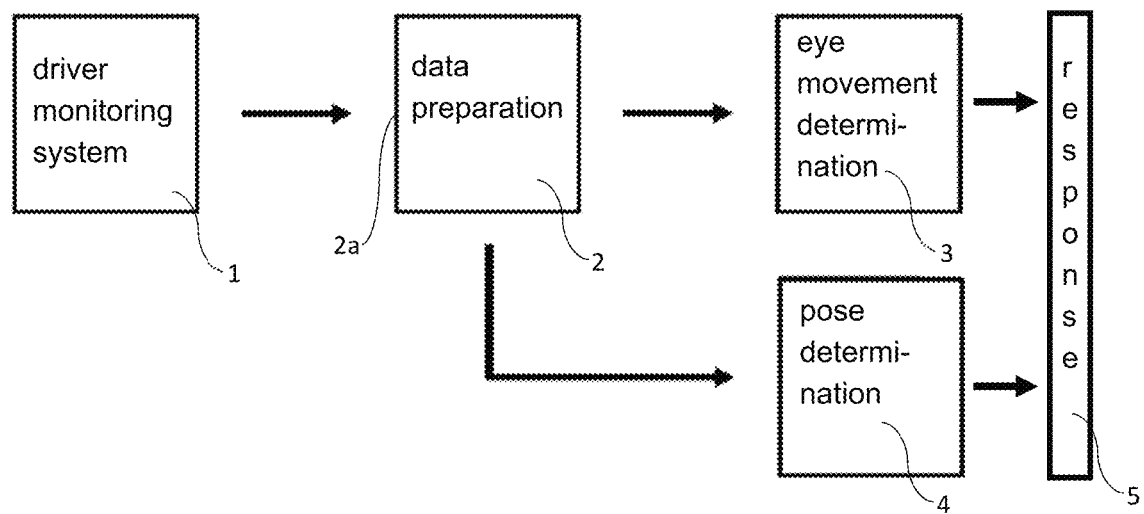
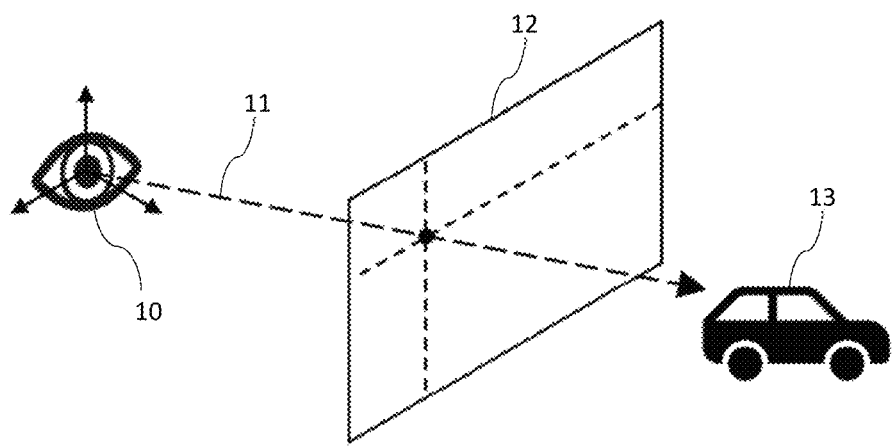
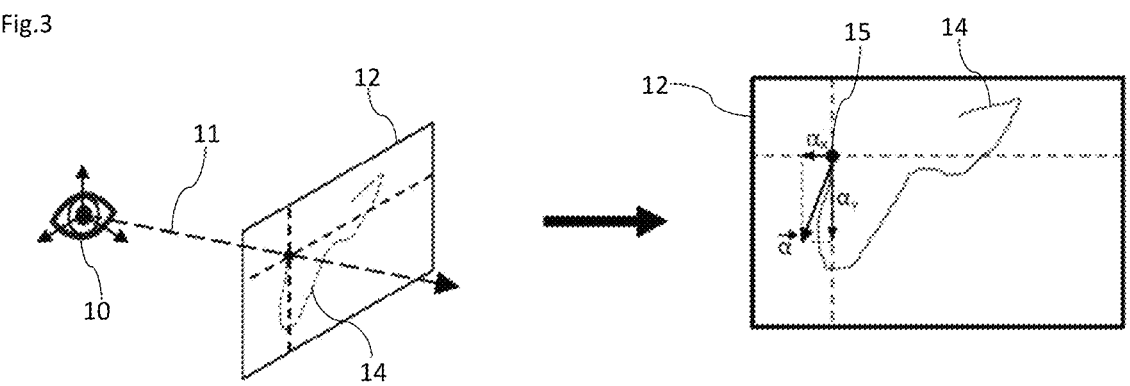

EYE TRACKING FOR DETECTION OF DIMINISHED DRIVER CONTROL

CROSS-REFERENCE TO RELATED APPLICATIONS

This application claims priority to EP App. No. 22197925 filed Sep. 27, 2022, the entire disclosure of which is incorporated by reference.

FIELD

The present disclosure relates to a diminished driver control detection system, method, and software. The present invention is particularly relevant to driver intoxication detection systems and methods of detecting when a driver is suffering from diminished physical or mental control.

BACKGROUND

It represents a significant hazard when a driver operates a vehicle when intoxicated. For example, a driver who has their physical or mental control markedly diminished by the effects of alcohol or drugs is statistically much more likely to be involved in a car crash owing to, for instance, their reduced reaction time, lack of positional awareness and increased tolerance to risk. As such, regulators, governments, and law enforcement bodies are keen to prevent the use of vehicles when a driver has diminished control in order to improve road safety and compliance with the law.

In this respect, in some jurisdictions, courts may already mandate for convicted drunk drivers to have a breath alcohol ignition interlock device fitted to their car to prevent use without a clear breathalyzer test result. Such a system therefore makes it more difficult for the vehicle to be used after the driver has been drinking. However, such systems are too inconvenient for widespread adoption, and can be easily circumvented, for example by a having a sober person blow into the device.

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Accordingly, there remains a need to provide improved systems for restricting or preventing the use of vehicles while suffering from diminished control, for instance due to intoxication or other conditions affecting physical or mental capacity.

According to a first aspect, there is provided a system for monitoring a driver including an input for receiving eye tracking data for a driver driving a vehicle; a processing block for determining gaze movement characteristics for the driver based on the eye tracking data; and a determination block for determining characteristics indicative of diminished driver control at least in part on the determined gaze movement characteristics.

In this way, a driver being in a state of diminished control, such as when intoxicated on drink or other drugs, may be identified based on the characteristics of their eye movements, such as the detected eye movement speed and the frequency of changes in eye movement direction. As such, a driver's capacity to responsibly control the vehicle may be assessed to improve safety. Advantageously, the system may use eye tracking data from existing driver monitoring systems thereby minimizing the cost of implementation. That is, existing driver monitoring systems may already track a driver's gaze direction, for example, to verify they are looking at the road. The diminished driver control detection system may use this raw eye tracking data to determine eye movement characteristics and identify when these indicate a pathological condition in which the driver's control of the vehicle is compromised. Importantly, because tracked eye movement characteristics directly correlate to the driver's attention while they are operating the vehicle, the system is much harder to circumvent than conventional breathalyzer-based systems and is able to identify a wider variety of pathological conditions.

In various implementations, the gaze movement characteristics includes gaze movement vectors in the time domain. In this way, the characteristic information may provide metrics related to eye movement acceleration, velocity, and focus time (period of eye movement inactivity), all of which may provide indicators for pathological conditions potentially affecting the driver's control.

In various implementations, the eye tracking data includes gaze coordinate data and wherein the processing block is configured to generate gaze movement vectors based on changes in the gaze coordinate data over time. In this way, a two-dimensional plot of the driver's gaze can be used to allow for straightforward generation of gaze movement vectors.

In various implementations, the determination block determines diminished driver control based at least in part on the determined gaze movement characteristics being outside one or more predetermined baseline gaze movement characteristic ranges. In this way, a high detection accuracy can be achieved by comparing a driver's behavior to baseline levels and monitoring for deviations outside the normal ranges associated with these.

In various implementations, the predetermined baseline gaze movement characteristic ranges are based on prerecorded gaze movement characteristic data for the driver. In this way, the driver's previous behavior can be used as a benchmark for normal eye movement characteristics, and hence a significant change in characteristics may be used as an indicator for a loss of control.

In various implementations, the determination block includes a trained neural network for identifying characteristics outside one or more predetermined baseline gaze movement characteristic ranges. In this way, a neural network may be trained based on a driver's normal eye movement characteristics and may then be used to identify characteristics which deviate from this.

In various implementations, the determination block is configured to determine diminished driver control by identifying a potential pathological condition of the driver based, at least in part, on the determined gaze movement characteristics. In this way, pathological conditions associated with diminished driver control can be identified based on the identification of affected eye movement.

In various implementations, the determination block is configured to determine diminished driver control by identifying intoxication of the driver based, at least in part, on the determined gaze movement characteristics. In this way, pathological conditions arising from alcohol or other drugs may be identified.

In various implementations, the input is further for receiving pose tracking data for a driver driving a vehicle, and wherein the determination block determines diminished driver control further based on the pose tracking data. In this way, accuracy can be enhanced by using other driver status monitoring sources, such as their body position, to validate a determination that a driver has diminished control.

In various implementations, the determination block determines diminished driver control further based on the pose tracking data having predetermined characteristics associated with diminished driver control. In this way, the pose tracking data may be used to identify when a driver adopts poses associated with a loss of control, which may corroborate control loss indicators provided by the eye tracking data.

In various implementations, the determination block is further configured to generate a control signal for controlling the vehicle to trigger a safety response. In this way, the system may prompt a vehicle intervention based on the determined issue. For example, the control signal may trigger one or more of an alarm, a dashboard light indicator, a seat vibration, activation of the vehicle's hazard lights, a vehicle speed restriction, and a change in autonomous driving mode.

According to a further aspect, there is provided a method for monitoring a driver including: receiving eye tracking data for a driver driving a vehicle; determining gaze movement characteristics for the driver based on the eye tracking data; and determining characteristics indicative of diminished driver control at least in part on the determined gaze movement characteristics.

In various implementations, the step of determining gaze movement characteristics includes processing the eye tracking data to calculate changes in the gaze coordinate data over time.

In various implementations, the step of determining diminished driver control includes determining if the determined gaze movement characteristics are outside one or more predetermined baseline gaze movement characteristic ranges.

In various implementations, the step of determining diminished driver control includes identifying a potential pathological condition of the driver based, at least in part, on the determined gaze movement characteristics.

According to a further aspect, there is provided non-transient computer readable medium including instructions which, when executed by a processor, implement the above method.

According to a further aspect, there is provided a computer software product including instructions which, when executed by a processor, implement the above method.

BRIEF DESCRIPTION OF THE DRAWINGS

The present disclosure will become more fully understood from the detailed description and the accompanying drawings.

FIG. 1 shows a schematic illustration of a diminished driver control detection system according to an illustrative embodiment.

FIG. 2 shows a schematic illustration of an eye gaze tracking arrangement.

FIG. 3 shows a schematic illustration of an eye gaze tracking scenario.

In the drawings, reference numbers may be reused to identify similar and/or identical elements.

DETAILED DESCRIPTION

As an overview, psychoactive substances, such as alcohol or other drugs, can significantly affect the movement of an individual's eyes, causing nystagmus, affecting saccades, altering vestibulo-ocular reflex and influencing various changes in their gaze. Accordingly, by using driver eye gaze tracking, and observing patterns of pathological eye movement, the driver's intoxication state may be assessed. Eye tracking data may also be combined with other driver status information, such as the driver's pose, pupil dilation, blinking frequency and their face temperature, to cross check driver behavior and identify changes in characteristics which indicate a state of diminished physical and mental control.

To explain this further, FIG. 1 shows a schematic illustration of a diminished driver control detection system according to an illustrative embodiment. A driver monitoring system 1 is used to provide eye tracking data to an input 2a of a data preparation block 2, which in turn generates gaze vector information from the eye tracking data, as is described in further detail below. This is then fed to an eye movement determination block 3 which is used to identify pathological conditions based on the gaze vector information. At the same time, in this embodiment, the driver monitoring system 1 is also used to provide pose tracking data which is fed to a pose determination block 4 and is used to identify poses associated pathological conditions. The outputs of the eye movement determination block 3 and the pose determination block 4 are received by a response block 5 which generates control instructions for limiting vehicle operation or triggering safety responses when it is determined that the driver's control is diminished.

In further detail, the driver monitoring system 1 uses a driver-facing camera equipped with infrared light-emitting diodes (LEDs) or lasers to generate images of the driver's face and eyes, and in this embodiment their torso too. It will be understood that the driver monitoring system 1 may form part of other ADAS or autonomous driving systems in the vehicle, since such driver monitoring is typically required for autonomous driving level 3 and 4 functionality. As such, the diminished driver control detection system may make use of existing ADAS or autonomous driving architecture.

In use, the driver monitoring system 1 generates eye tracking data indicating the coordinates of a driver's gaze on a field of view frame. In this respect, FIG. 2 shows an illustrative schematic of an eye gaze tracking arrangement in which an eye 10 is monitored by one or more cameras and the eye's gaze 11 is determined based on eye position. As shown, in this scenario, the driver's gaze 11 is on another vehicle 13. Eye tracking allows the gaze 11 to be plotted as a gaze coordinate on a 2D field of view frame 12. The gaze coordinate can then be logged in the time domain to provide 2D gaze tracking data. In this embodiment, the driver monitoring system 1 also generates body key point tracking data which indicates the relative positions of key points on their body, such as their head, shoulders and arms.

As mentioned above, the eye tracking data is fed to a data preparation block 2 via input 2a, which generates gaze vector data in the time domain from the eye tracking data. In this respect, FIG. 3 shows a schematic illustration of an eye gaze tracking scenario to explain the vector generation in further detail. As shown, the gaze coordinate on the field of view frame 12 is tracked over time as the driver moves their eye 10. This generates 2D gaze tracking data 14. This gaze tracking data 14 may then be processed to generate gaze movement vector data 15 which plots both the direction and speed at which the drivers' eyes are moving. Accordingly, the gaze movement vector data 15 provides characteristic information regarding eye movement, including eye movement acceleration, velocity, and focus time (period of eye movement inactivity).

The gaze movement vector data 15 is fed to an eye movement determination block 3 which is used to identify pathological conditions based thereon. In this respect, pathological conditions indicating diminished driver control may be identified based on a number of characteristics. For example, frequent rapid eye movements may be determined to indicate the influence of particular drugs. Conversely, very slow eye movements may be determined to indicate the influence of alcohol or other drugs. In various implementations, the eye movement determination block 3 may contain stored baseline characteristics, for example collected from test subject drivers or collected from the present driver over their use of the vehicle. This may be used to set an initial baseline of eye movement characteristics for what the driver's normal, attentive state should be. The eye movement determination block 3 may then determine the presence of a pathological condition of diminished driver control when the detected eye movement characteristics deviate from the baseline by more than a predetermined amount. For instance, if the driver's eyes are moving faster and/or more frequently than usual (e.g. outside of normal velocity and/or frequency ranges), this may be determined to indicate the influence of drugs. It will be appreciated that the particular characteristics used to determine diminished driver control may vary, for example, depending on the particular requirements of the vehicle or the region it is operating in. For instance, some countries may choose to implement stricter driver intoxication controls.

As mentioned above, in this embodiment, the driver monitoring system 1 also provides pose tracking data which is fed to a pose determination block 4. The pose determination block 4 receives body key point data indicating the pose the driver is in, which in turn may be used to identify poses associated with pathological conditions where driver control is diminished. For this, the pose determination block 4 may include a plurality of stored pose characteristics or behaviors associated with conditions where a driver may have diminished control, and the pose determination block 4 to determines when the pose tracking data indicates the driver is in one of these poses. For example, in various implementations, baseline pose characteristics for a driver may be ascertained from the driver's initial use of the vehicle. The pose movement determination block 4 may then determine pathological conditions of diminished driver control when the detected pose movement characteristics deviate from the baseline by more than a predetermined threshold. For instance, uncharacteristic head positions and rotation, oscillating head movements, slumped chest and shoulder positions, unusual hand positions and movements, and hands being held in a given zone for an extended duration (e.g. fiddling with the media controls or movements away from the steering wheel) may be used to indicate diminished driver control.

The response block 5 receives the outputs of the eye movement determination block 3 and the pose determination block 4 and generates control instructions based on these. For example, the eye movement determination block 3 may indicate the diminished driver control has been identified with sufficient certainty that a response is triggered immediately. In other scenarios, the eye movement determination block 3 may indicate that diminished driver control is suspected, but requires additional validation by the pose identified by the pose determination block 4 for confirming the likelihood of diminished driver control.

Where diminished driver control has been identified, the control instructions issued by the response block 5 may act to limit vehicle operation or trigger safety responses. For example, the response block 5 may trigger an audio alert, light up the dashboard, vibrate the seat, and/or flash the hazard lights, to prompt the driver to act themselves to bring the vehicle to a controlled stop. In other arrangements, the response block 5 may trigger higher level interventions, such as restricting the vehicle's speed or engaging a safer autonomous driving mode (e.g. by increasing the distance between vehicles). In some various implementations, the response block 5 may trigger autonomous driving systems to intervene to take the vehicle to a controlled stop at the next available safe stopping point, whereafter the vehicle may be deactivated to prevent further use. In various implementations, the response level may be based on the determined severity of the driver's lack of control. For example, if an extreme loss of driver control is detected, the response block 5 may turn on the vehicle's hazard lights and engage autonomous driving systems to slow the vehicle down and pull it over to the side of the road.

In this way, a diminished driver control detection system may be provided for identifying when a driver's capacity to responsibly control the vehicle is reduced. Advantageously, the system may use tracking data from existing driver monitoring systems to provide additional safety. At the same time, unlike conventional ignition interlock devices which rely on breath alcohol testing, gaze vector tracking directly correlates to the driver's attention while they are operating the vehicle. As such, the diminished driver control detection system is much harder to circumvent and is able to identify a wider variety of pathological conditions, rather than just alcohol intoxication. Furthermore, a high detection accuracy can be achieved by comparing a driver's behavior to baseline levels and monitoring for deviations from this. Moreover, accuracy can be further enhanced by using other driver status monitoring sources to validate a determination that a driver has diminished control. Consequently, the risk of false positives is minimized.

It will be understood that the implementations illustrated above show applications only for the purposes of illustration. In practice, implementations may be applied to many different configurations, the detailed variations being straightforward for those skilled in the art to implement.

For example, it will be understood that whilst the above implementations are described in relation to scenarios where a driver has diminished control due to alcohol or drug intoxication, implementations may also be implemented for restricting vehicle use when a driver is suffering from other conditions affecting physical or mental capacity. For example, eye tracking data may be used to identify if a driver is suffering from a stroke or an epileptic seizure and, in response, the system may trigger an intervention to bring the vehicle to a controlled stop or to limit its speed.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system for monitoring a driving operation in a real vehicle on a road, the system comprising:
    an input configured to receive eye tracking data and pose tracking data for a present driver operating the vehicle;
    a processing block configured to determine both gaze movement characteristics for the present driver from the eye tracking data and pose characteristics for the present driver from the pose tracking data; and
    a determination block configured to determine characteristics indicative of diminished driver control associated with a potential pathological condition from both the determined gaze movement characteristics and the determined pose characteristics,
    wherein the determination block determines diminished driver control associated with the potential pathological condition from both the determined gaze movement characteristics and the determined pose characteristics being outside stored baseline characteristic ranges derived from prerecorded gaze movement and pose characteristic data for the present driver during their use of the vehicle on the road.

2. The system of claim 1, wherein the gaze movement characteristics include gaze movement vectors in a time domain.

3. The system of claim 2, wherein the processing block is configured to generate the gaze movement vectors from changes in eye tracking data over time.

4. The system of claim 1, wherein the determination block includes a trained neural network for identifying characteristics outside of the stored baseline characteristic ranges.

5. The system of claim 1, wherein the determination block is configured to determine diminished driver control by identifying intoxication of the present driver from the determined gaze movement characteristics.

6. The system of claim 1, wherein:
    the pose tracking data is based on deviations from stored baseline pose characteristics; and
    the deviations include at least one of uncharacteristic head positions, uncharacteristic head rotation, oscillating head movements, slumped chest positions, slumped shoulder positions, unusual hand positions, unusual hand movements, and hands being held in a given zone for an extended duration.

7. The system of claim 1, wherein the gaze movement characteristics include a gaze of the present driver on another vehicle.

8. The system of claim 1, wherein the determination block is configured to generate a control signal for controlling the vehicle to trigger a safety response.

9. A method for monitoring a driving operation of a real vehicle on a road, the method comprising:
    receiving eye tracking data for a present driver operating the vehicle;
    receiving pose tracking data for the present driver;
    prerecording and storing baseline gaze movement characteristic ranges for the present driver derived from prerecorded gaze movement characteristic data from the eye tracking data for the present driver during their use of the vehicle;
    prerecording and storing baseline pose characteristic ranges for the present driver derived from prerecorded pose characteristic data from the pose tracking data for the present driver during their use of the vehicle;
    determining instant gaze movement characteristics for the present driver from instant eye tracking data;
    determining instant pose characteristics for the present driver from instant pose tracking data; and
    determining characteristics indicative of diminished driver control associated with a potential pathological condition from the respective instant determined gaze movement characteristics and instant determined pose characteristics being outside the respective stored baseline gaze movement and pose characteristic ranges.

10. A non-transitory computer-readable medium comprising instructions that, when executed by a processor, implement:
    receiving eye tracking data for a present driver presently operating a real vehicle on a road;
    receiving pose tracking data for the present driver;
    prerecording and storing baseline gaze movement characteristic ranges for the present driver derived from prerecorded gaze movement characteristic data from the eye tracking data for the present driver during their use of the vehicle;
    prerecording and storing baseline pose characteristic ranges for the present driver derived from prerecorded pose characteristic data from the pose tracking data for the present driver during their use of the vehicle;
    determining instant gaze movement characteristics for the present driver from instant eye tracking data;
    determining instant pose characteristics for the present driver from instant pose tracking data; and
    determining characteristics indicative of diminished driver control associated with a potential pathological condition from the respective instant determined gaze movement characteristics and instant determined pose characteristics being outside the respective baseline gaze movement and pose characteristic ranges.

* * * * *